United States Patent
Okamura

(10) Patent No.: US 7,426,291 B2
(45) Date of Patent: Sep. 16, 2008

(54) APPARATUS AND METHOD FOR BINARIZING IMAGES OF NEGOTIABLE INSTRUMENTS USING A BINARIZATION METHOD CHOSEN BASED ON AN IMAGE OF A PARTIAL AREA

(75) Inventor: Yukihiro Okamura, Hotaka-machi (JP)

(73) Assignee: Seiko Epson Corporation (JP)

( * ) Notice: Subject to any disclaimer, the term of this patent is extended or adjusted under 35 U.S.C. 154(b) by 1015 days.

(21) Appl. No.: 10/632,267

(22) Filed: Jul. 29, 2003

(65) Prior Publication Data

US 2004/0136586 A1 Jul. 15, 2004

(30) Foreign Application Priority Data

Jul. 29, 2002 (JP) ............................. 2002-220113

(51) Int. Cl.
*G06K 9/00* (2006.01)
(52) U.S. Cl. ...................... 382/137; 382/270; 382/319
(58) Field of Classification Search ................ 382/137, 382/138, 139, 140, 172, 270, 318, 319
See application file for complete search history.

(56) References Cited

U.S. PATENT DOCUMENTS

| 5,351,313 | A | * | 9/1994 | Bessho et al. ................. 382/51 |
| 5,508,823 | A | | 4/1996 | Kiyohara et al. ............ 358/463 |
| 6,385,347 | B1 | | 5/2002 | Matsuda ..................... 382/263 |
| 6,411,737 | B2 | * | 6/2002 | Wesolkowski et al. ...... 382/237 |
| 6,671,395 | B1 | * | 12/2003 | Ott et al. ..................... 382/137 |
| 6,792,133 | B2 | * | 9/2004 | Ott et al. ..................... 382/112 |
| 2003/0068077 | A1 | | 4/2003 | Koakutsu et al. ............ 382/135 |

FOREIGN PATENT DOCUMENTS

| JP | 04-092570 A | 3/1992 |
| JP | 04-180349 A | 6/1992 |
| JP | 04-352082 A | 12/1992 |
| JP | 5-101181 A | 4/1993 |
| JP | 06-054180 A | 2/1994 |
| JP | 06-318245 A | 11/1994 |
| JP | 08-037600 A | 2/1996 |
| JP | 9-22468 A | 1/1997 |
| JP | 09-091417 A | 4/1997 |
| JP | 10-262153 A | 9/1998 |
| JP | 11-348242 A | 12/1999 |
| JP | 2000-156782 A | 6/2000 |
| JP | 2002-016801 A | 1/2002 |

OTHER PUBLICATIONS

Examination Report which issued in the corresponding Japanese Patent Application citing the above references.

* cited by examiner

*Primary Examiner*—Andrew W. Johns
(74) *Attorney, Agent, or Firm*—Anderson Kill & Olick, PC

(57) ABSTRACT

An image processing apparatus, method and computer-readable data storage medium to identify and process a negotiable instrument comprising a pre-processing unit 20 to select a binarization method to be used in a main processing unit 30 based on image data from only a scanned image of specific parts of the negotiable instrument for converting a full image of the entire negotiable instrument to binary image data.

12 Claims, 18 Drawing Sheets

↓ APPLY SHARPEN FILTER

APPARATUS AND METHOD FOR BINARIZING IMAGES OF NEGOTIABLE INSTRUMENTS USING A BINARIZATION METHOD CHOSEN BASED ON AN IMAGE OF A PARTIAL AREA

BACKGROUND OF THE INVENTION

1. Field of the Invention

The present invention relates to an apparatus, method and computer-readable data storage medium for processing images from a negotiable instrument, and more particularly to an image processing apparatus and method for acquiring images from negotiable instruments for use in electronically clearing payments of negotiable instruments such as checks and other financial instruments.

2. Description of Related Art

Negotiable instruments such as checks, gift certificates, coupons and the like are often used to settle transactions between businesses as well as pay for purchases in stores and restaurants. A typical payment process using a check as the negotiable instrument is described below.

Tracking information including the bank code and account number of the check is printed to the front of each check and can be used to verify whether a check is valid.

When a check is presented for payment in a store, for example, check validity is confirmed, the front of the check is completed with the date, amount, and payer signature, and an endorsement is then printed on the back. The check front and endorsement are today commonly printed by a POS printer so that the payer only needs to sign the check. After check processing is completed in the store, the check is then passed to a bank or other financial clearinghouse for check clearing. Advances in image processing technologies in recent years have enabled checks to be cleared more efficiently by electronically transmitting images of the check front and back together with transaction data instead of handling the physical check.

Negotiable instruments such as checks, gift certificates and the like also typically have a background pattern printed on the front. This can make it difficult to read such important information as the account number, payment amount, payer, payee, and signature if the imaging resolution is low. On the other hand, capturing check images at high resolution or in color results in a slower scanning speed. This also increases the data size of each image and increases the processing load of the image capture, data transfer, and data storage systems. Much time is therefore required for image acquisition and processing.

One method proposed for acquiring images of negotiable instruments that can be used for electronic clearing scans the negotiable instrument to capture the image, and then binarizes the image based on density values in the image to acquire binary image data. With this method the threshold value for binarizing image data based on image density values can be calculated and set dynamically based on the scanned image.

When this threshold value is dynamically variable and calculated for each scanned image, the threshold value is determined from the background pattern in a preliminary scanning area. If the background pattern in the image of the negotiable instrument is not uniform, that is, if the background image in one part of the image differs greatly from the background image used to set the threshold value, it may not be possible to read the essential information, i.e., the account number, payment amount, payer, payee, and signature in the case of a check, from the background pattern in the binary image data.

SUMMARY OF THE INVENTION

In accordance with the apparatus and method of the present invention a scanned image of a selected part of a negotiable instrument is used during payment processing to determine a binarization method to be used for binarizing the full image of the negotiable instrument. The selected scanned image is used to accurately acquire essential information including the account number, payment amount, payer, payee, and signature as image information with a small data size.

A first aspect of the present invention is an image processing apparatus comprising: a main processing unit that captures first image data by scanning entire area of a negotiable instrument, and converts the first image data to binary image data; and a pre-processing unit that reads second image data acquired from a partial area of the negotiable instrument, and determines a binarization method for converting the first image data to the binary image data based on the second image data.

The partial area preferably includes a text area containing magnetic ink characters preprinted to the negotiable instrument, and one or more background areas containing a background pattern in at least part thereof.

Further preferably, the image processing apparatus also has an edge pixel detection unit for detecting edge pixels from the background area. The pre-processing unit in this case determines the binarization method based on the number of detected edge pixels.

Further preferably, the pre-processing unit selects the binarization method based on a density distribution of pixels in the background of characters in the text area, and a density distribution of pixels forming the background area.

Yet further preferably, the processing unit comprises a threshold value calculator for setting a threshold value for use in executing the selected one of the binarization methods with the threshold value for the first binarization method being derived from a density distribution calculation of the second image data and with the threshold value for the second binarization method set at a predefined constant value and an evaluation section for evaluating the second image data to select the binarization method based upon the calculation of the threshold value with the image processing apparatus further comprising secondary binarization means that sharpens the first image data by enhancing edge pixels of the first image data when said threshold value is set at said predefined constant value during execution of said second binarization method.

Another aspect of the present invention is an image processing method comprising steps of:

(a) scanning an image of a partial area of a negotiable instrument;

(b) evaluating the scanned image of the partial area in step (a);

(c) selecting a binarization method from one of at least a first and second binarization method based upon the evaluation of the scanned image in step (b); and (d) converting an image of the entire negotiable instrument to binary image data by applying the binarization method selected in step (c).

Preferably in this image processing method the partial area includes a text area containing magnetic ink characters preprinted to the negotiable instrument, and one or more background areas containing a background pattern in at least part thereof.

Further preferably, this image processing method also has steps of:

(e) detecting edge pixels from the background area; and (f) determining the binarization method based on the number of edge pixels detected in step (e).

Yet further preferably, this image processing method also has a step of:

(g) determining the binarization method based on a density distribution of pixels in the background of characters in the text area, and a density distribution of pixels forming the background area.

Yet further preferably, this image processing method also has steps of:

(h) setting a threshold value for use in executing the selected one of said binarization methods with the threshold value for a first binarization method being derived from a density distribution calculation in step (a) of the second image data and with the threshold value for a second binarization method set at a predefined constant value;

(i) selecting said second binarization method when the threshold value calculated from said density distribution of the second image data in step (a) exceeds a predetermined number or does not compute within a given range; and (j) sharpening the image of the entire negotiable instrument when said second binarization method is selected by enhancing edge pixels thereof, and converting the sharpened image of the entire negotiable instrument to binary image data.

A further aspect of the present invention is a computer-readable data storage medium for recording a program for executing the steps of the image processing method described above.

Other advantages and attainments of the subject invention will become apparent and appreciated by referring to the following description and claims taken in conjunction with the accompanying drawings.

DETAILED DESCRIPTION OF THE PREFERRED EMBODIMENTS

Preferred embodiments of the present invention are described below with reference to the accompanying figures. These embodiments are described by way of example only and shall not limit the scope of the present invention. Furthermore, various changes and modifications will be apparent to those skilled in the art. Such changes and modifications are to be understood as included within the scope of the present invention as defined by the accompanying claims.

Figure 1:
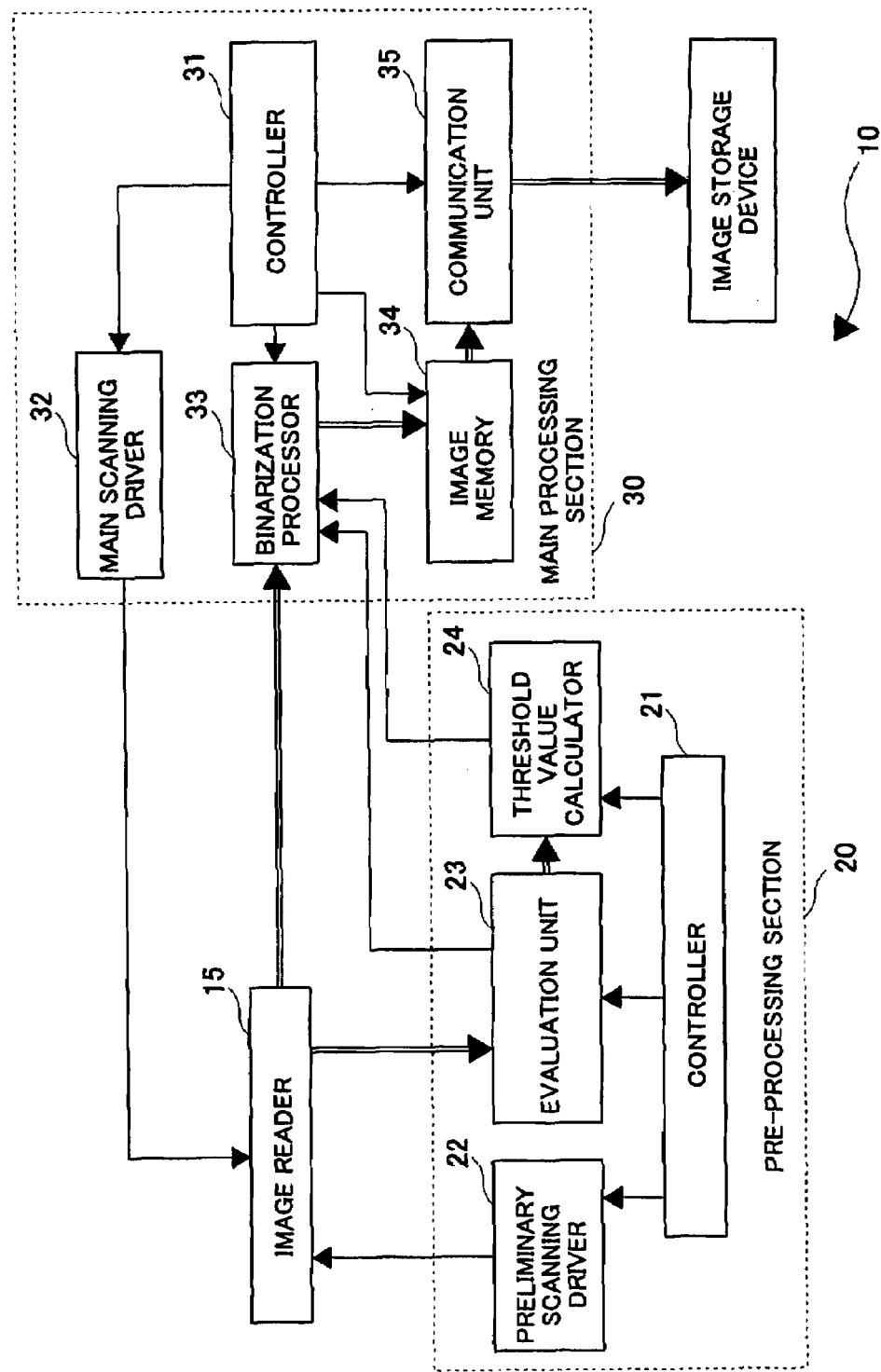
FIG. 1 is a function block diagram for describing the basic concept of an image processing apparatus according to the present invention.

FIG. 1 is a function block diagram used to describe the basic concept of an image processing apparatus according to the present invention. To simplify, the following description of the invention focuses on the characteristic features of the invention and omits describing such parts as the transportation unit for transporting the negotiable instrument through the image processing apparatus.

Furthermore, while checks are used below as a typical negotiable instrument processed by this invention, the invention is not limited to processing checks and can be adapted for processing a variety of negotiable instruments, including gift certificates, coupons, and other such financial instruments.

As shown in FIG. 1 an image processing apparatus 10 according to this preferred embodiment of the invention has an image reader 15, pre-processing unit 20, and an main processing unit 30.

The pre-processing unit 20 has a preliminary scanning driver 22, evaluation unit 23, threshold value calculator 24, and a controller 21 for systematically controlling these other parts 22, 23, and 24.

The main processing unit 30 has a controller 31, main scanning driver 32, binarization processor 33, image memory 34, and communication unit 35.

When a customer pays for a purchase by check, the check is first inserted to the check insertion part (not shown in the figure) of the image processing apparatus 10. A check feed mechanism (not shown in the figure) is then driven by the preliminary scanning driver 22 of the pre-processing unit 20 so that part of the check is read by the image reader 15. Image data for the scanned part of the check is then output from the image reader 15 to the evaluation unit 23.

The image reader 15 in this preferred embodiment has a monochrome image sensor, and the output image data is gray scale data in which the value of each pixel is expressed as a luminance value (referred to below as "density") in the range 0 to 255.

The evaluation unit 23 determines the binarization process to be used to binarize the image data for the entire check from the gray scale data acquired for the selected part of the check preliminarily scanned by the image reader 15.

The binarization process selected by the evaluation unit 23 is one of the following two methods in this embodiment.

The first method is referred to below as the "threshold value calculation method." In this method the threshold value for binarizing the image is calculated by analyzing the density distribution of the pixels in the gray scale data acquired for the scanned part of the check. Image data for the entire check is then binarized using this threshold value.

The second method is referred to below as the "sharpness method." This method applies a sharpen filter to enhance edge pixels in the image data for the entire check. The sharpened image data is then binarized based on a specific predetermined threshold value.

If the binarization method selected by the evaluation unit 23 is the sharpness method, the binarization processor 33 of the main processing unit 30 applies the sharpness method to the image data for the entire check.

If the selected binarization method is the threshold value calculation method, the gray scale data for the preliminarily scanned part of the check is output from the evaluation unit 23 to the threshold value calculator 24. The threshold value calculator 24 then calculates the threshold value for binarizing image data for the entire check. The threshold value computed by the threshold value calculator 24 is passed to the binarization processor 33 of the main processing unit 30. The binarization processor 33, then, stores this threshold value, and binarizes the image data for the entire check with reference to the calculated threshold value.

The controller 21, preliminary scanning driver 22, evaluation unit 23, and threshold value calculator 24 are controlled in conjunction with each other.

The controller 31 controls the other parts 32, 33, 34, and 35 of the main processing unit 30.

The main scanning driver 32 controls scanning the check based on a scan command from the controller 31. When a scan command from the controller 31 is detected, the main scanning driver 32 controls operation of the image reader 15 to capture an image of the entire check. Like the image data for selected parts of the check, the image of the entire check is also gray scale data in this embodiment of the invention. The image reader 15 outputs the gray scale data for the entire check to the binarization processor 33.

The binarization processor 33 then converts the gray scale data for the entire check received from the image reader 15 to binary image data based on the binarization method selected by the evaluation unit 23.

The binary image data for the check output by the binarization processor 33 is stored to the image memory 34 and sent through communication unit 35 to an image storage device. While the main processing unit 30 preferably stores the binary image data to an internal image memory 34 as in this example, the image memory 34 could be omitted and the data stored directly to the image storage device. The image storage device stores the binary image data so that it can be queried and a specific image can be retrieved. This is so that the check image can be read and referenced for confirmation when clearing payment through a financial institution or if some problem occurs and the payer needs to reference the check. The image data can also be transmitted with the electronic payment data to the clearinghouse as needed.

Figure 2:
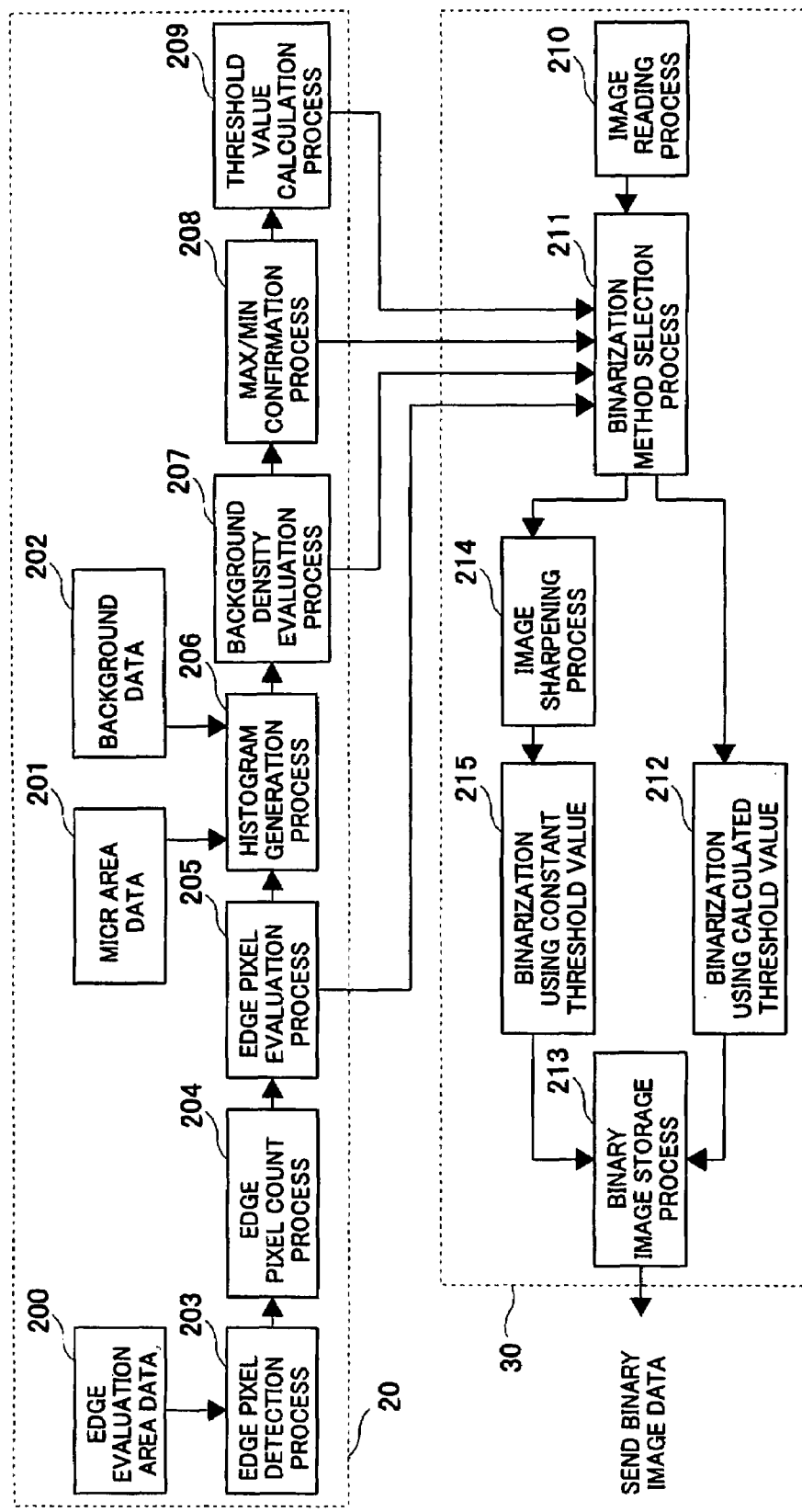
FIG. 2 is a block diagram describing how the pre-processing unit 20 determines the image binarization method, and the image capturing process of the main processing unit 30.

Operation of the pre-processing unit 20 and main processing unit 30 is described in further detail below with reference to FIG. 2. FIG. 2 is a block diagram showing an example of the process used by the pre-processing unit 20 to determine the binarization method, and the image acquisition process run by the main processing unit 30.

As described above the image reader 15 scans selected parts of the check and outputs gray scale data for the scanned parts. In this embodiment of the invention the image reader 15 scans specific parts of the check to capture edge evaluation area data 200, MICR area data 201, and background data 202.

An edge pixel detection process 203 is applied by the evaluation unit 23 to the edge evaluation area data 200 output from image reader 15. In the edge pixel detection process 203, the density difference between each pixel and a specific number of pixels surrounding each target pixel is calculated, and a frequency distribution of density difference values is generated. If the resulting frequency distribution is biased to a high absolute value of density difference values, the corresponding pixels are identified as edge pixels. This frequency denotes the number of pixels.

An edge pixel count process 204 is then run to compute the number of edge pixels detected by the edge pixel detection process 203. Then an edge pixel evaluation process 205 determines whether to use the threshold value calculation method or the sharpness method for the binarization process based on the edge pixel count passed from the edge pixel count process 204. The edge pixel evaluation process 205 makes this determination based on whether the edge pixel count is greater than a specific value.

If the threshold value calculation method is selected for the binarization process by the edge pixel evaluation process 205, the histogram generation process 206 is run using the MICR area data 201 and background data 202.

If the binarization process is the sharpness method, steps 206 to 209 are skipped and control moves to the process for acquiring an image of the entire check.

The histogram generation process 206 counts the number of pixels of each density value in the acquired gray scale data, computes the density distribution, and removes noise and averages the density distribution to obtain a smooth frequency distribution.

The background density evaluation process 207 is run after step 206 again determines whether to use the threshold value calculation method or sharpness method to binarize the image based on the density values in the MICR area data 201 and background data 202.

If the threshold value calculation method is selected in the background density evaluation process 207, the max/min confirmation process 208 is run to confirm the range of values that will be used by the threshold value calculator 24 to determine the threshold value. A calculation process 209 is then run to compute an appropriate threshold value in this range.

If the threshold value cannot be calculated for some reason, such as because the background is too dark, the binarization process is set to the sharpness method and the process for acquiring an image of the entire check is run.

The calculated threshold value is used in the process for binarizing gray scale data for the entire check as further described below.

Once the binarization method is determined the image reading process 210 is run to scan the completed signed check containing the payment amount, payee, and other information. That the binarization method has been determined means here that either the sharpness method was selected or the threshold value has been computed.

If the binarization method selection process 211 directs the binarization process to the threshold value calculation method, gray scale data for the full check image captured by the image reading process 210 is converted to binary image data by applying the binarization process 212 to each pixel using the threshold value computed by the threshold value calculator 24, and the gray scale image of the check is thus converted to a binary image. The binarized data is then temporarily stored as a binary image of the check and is sent to the image storage device by the binary image storage process 213.

If the binarization method selection process 211 directs the binarization process to the sharpness method, the edge pixels in the gray scale image of the check acquired by the image reading process 210 are enhanced by the image sharpening process 214, which produces sharpened image data. A binarization process 215 for binarizing the sharpened image data is then applied to each pixel based on a predefined constant threshold value, converting the sharpened image data to binary image data. The binarized data is then temporarily stored as a binary image of the check and is sent to the image storage device by the binary image storage process 213.

The image processing apparatus 10 described above can be achieved using hardware including a CPU, memory or other storage device, and a scanner, and a control program.

Figure 3:
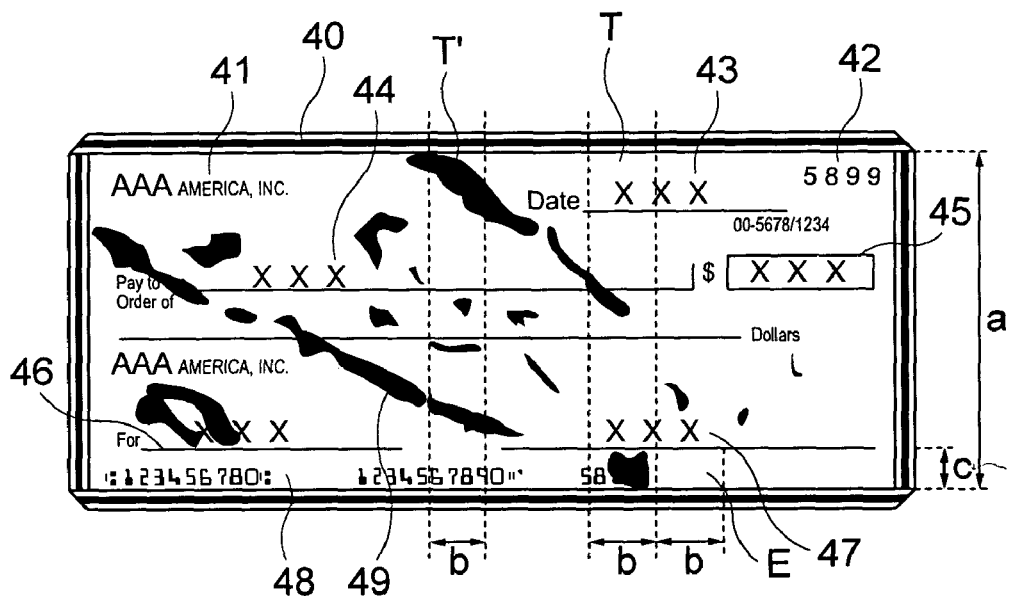
FIG. 3 is a plan view of a typical check.
Figure 4:
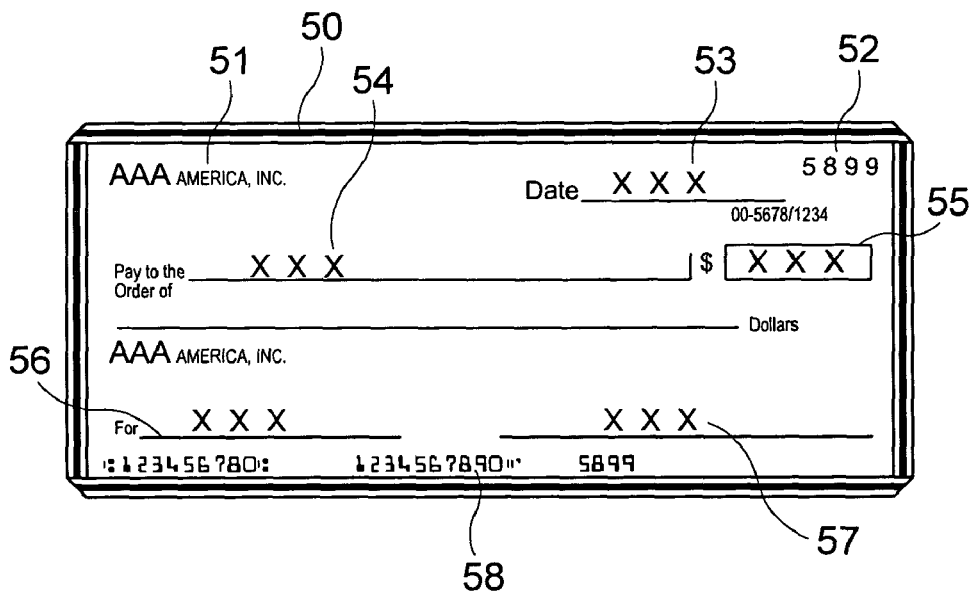
FIG. 4 shows an example of binary image data acquired from the check shown in FIG. 3.

FIG. 3 is a plan view showing the front of a typical check 40 used for payment, and FIG. 4 is shows exemplary binary image data acquired from the check shown in FIG. 3.

Printed or written on the check 40 are the payer 41, check number 42, date issued 43, payee 44, payment amount 45, memo 46, payer signature 47, and MICR text 48. "XXX" in the figures denote numbers, text, and the payer signature. Except for the MICR text 48, this other textual information can be either printed or written after the preliminary scan.

This sample check 40 also has a background pattern 49 accenting different parts of the check. Checks can have a wide range of background patterns of differing density. The background pattern shown in FIG. 3 is shown by way of example only, and is assumed here to feature a light gray background covering the entire check with a darker gray background pattern 49 accentuating different parts of the light gray background.

In the binary image data 50 shown in FIG. 4 all pixels have been binarized to either black or white, thereby removing the light gray base of the background and the darker background pattern 49. Reference numerals 51 to 58 in FIG. 4 correspond to reference numerals 41 to 48 in FIG. 3.

Figure 5:
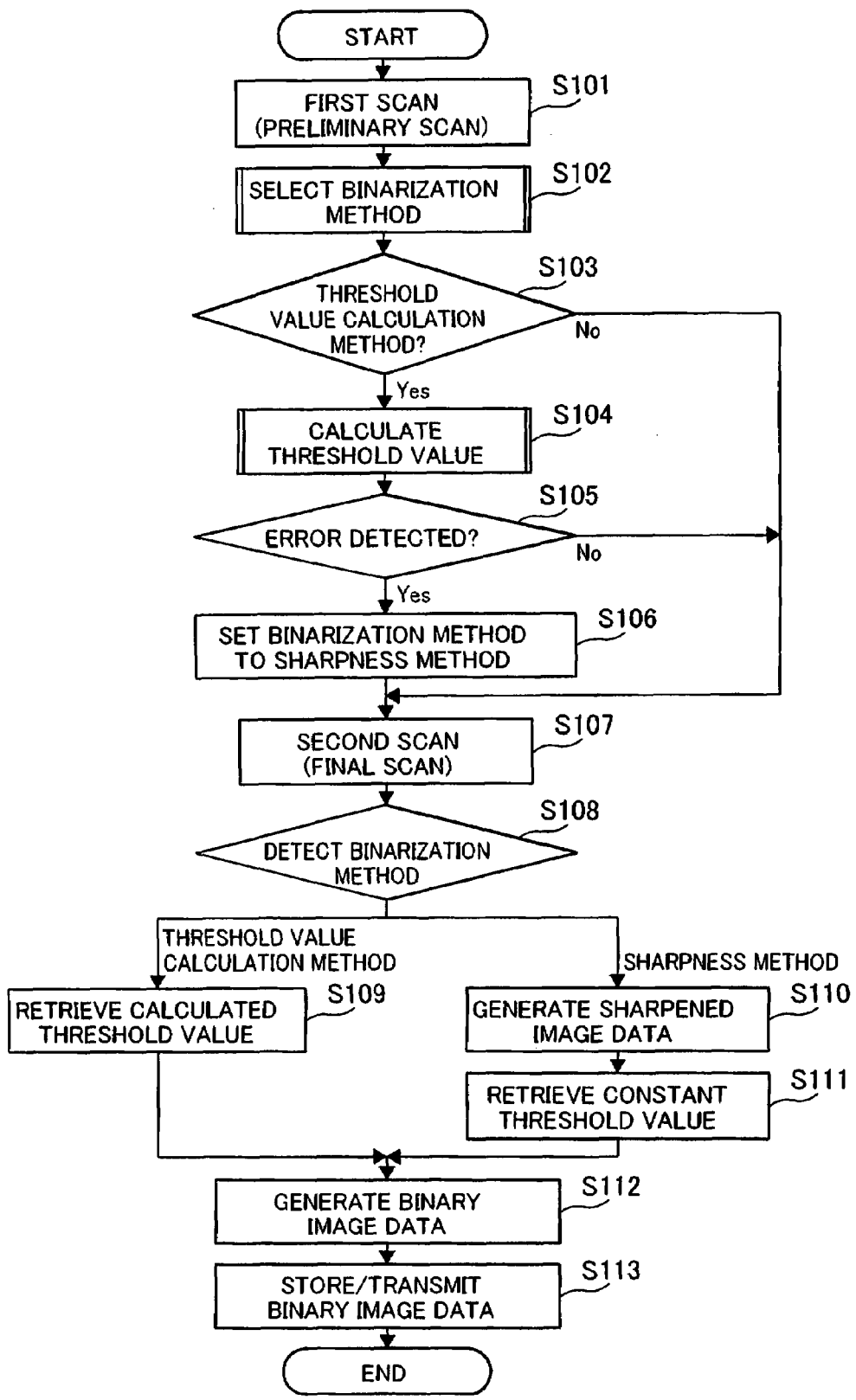
FIG. 5 is a flow chart describing the image capturing process for acquiring a binary image of a check in a preferred embodiment of the invention.

FIG. 5 is a flow chart showing an example of the image reading process when acquiring a binary image of a check.

As described above gray scale data is acquired from part of the check by a first scan ("preliminary scan" herein) (S101). The method used to convert image data for the entire check to binary image data is then determined (S102) based on the number of edge pixels detected from the partial gray scale data acquired by the preliminary scan, and the background density values calculated from the same gray scale data in the MICR text and background areas of the check as described above.

The provisionally scanned areas of the check here include the MICR text 48 and background pattern 49 of the check. Because the location of the MICR text 48 relative to the check width is known from the type of check, image data in the MICR text area of the check can be identified based on the output from the image reader 15. The area where the MICR text is printed is denoted "c" in FIG. 3. The MICR text 48 can be detected by scanning from one side of the check 40, typically the right as seen in the figure, and looking for specific image output from the part corresponding to MICR text area "c". The preliminary scanning area could also be set to a position offset a specific distance from where MICR text is first detected. Yet further, a hybrid processing apparatus having an MICR reader incorporated with the image processing apparatus 10 could confirm the location of the MICR text based on output from the MICR reader, and could determine the preliminary scanning area based on this information.

Preliminary scanning areas T and T' are shown by way of example in FIG. 3. Preliminary scanning area T is an area of width "b" from the first detected MICR character, while preliminary scanning area T' is an area of the same width b starting from a point offset a specific distance in the scanning direction from the first detected MICR character.

The preliminary scanning area preferably includes both MICR text and a part of the background pattern that best represents the check. Another area E of width b where there is no MICR text in the MICR printing area "c" could also be used as a preliminary scanning area in addition to preliminary scanning area T.

Figure 7:
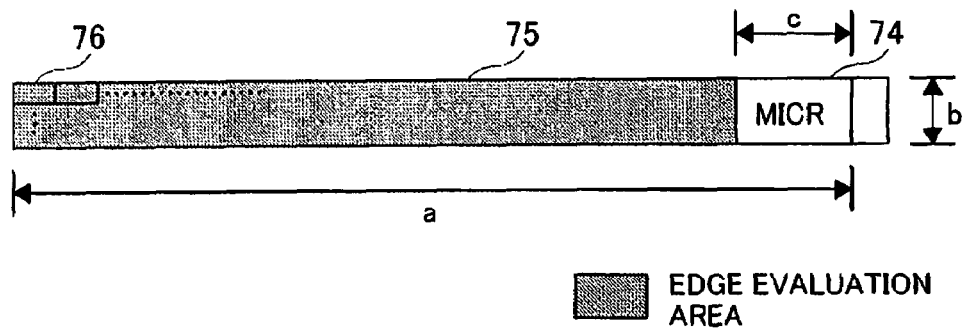
FIG. 7 is a schematic diagram of the preliminary scanning area used to determine the binarization method.
Figure 7:
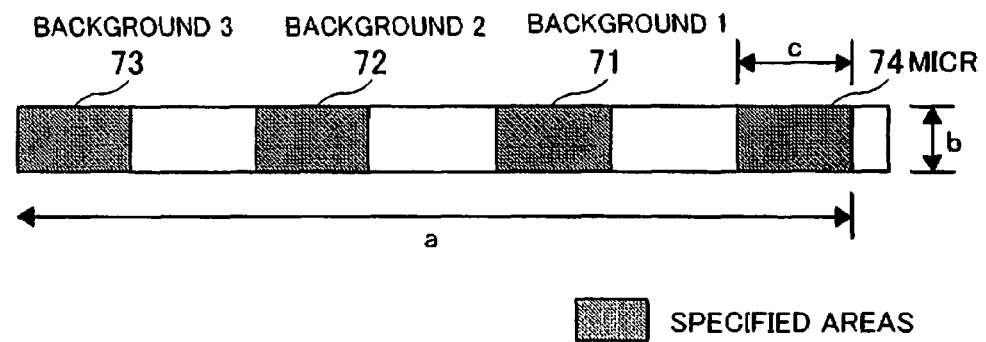

FIG. 7 shows an example of an image captured from a preliminary scanning area used to determine the method applied in the binarization process. FIG. 7(a) shows preliminary scanning area T shown in FIG. 3 and the area selected for edge pixel detection (the "edge evaluation area" below). FIG. 7(b) shows preliminary scanning area T shown in FIG. 3 and the area selected for generating the histogram of the MICR text area and the background printing area (the "identified area" below).

An area not including an MICR text area 74 was selected from the preliminary scanning area T as the edge evaluation area 75 in the FIG. 7(a) example. This is because text information necessarily populates the MICR text area and there are therefore many edge pixels. Detecting the edge pixels in an area other than where there is MICR text can therefore more accurately separate the background pattern from foreground information.

As noted above, area E in the MICR printing area "c" where there is no MICR text could also be included in the edge evaluation area.

In the FIG. 7(b) example, MICR text area 74 and three background areas 71 to 73 are selected from the preliminary scanning area T as the identified areas. Non-contiguous areas in the preliminary scanning area can thus be selected as the identified areas for histogram generation. What types of areas are selected as the identified areas can be determined according to the application. However, the identified areas preferably include MICR text and a dark part of the background pattern, and should be large enough to contain at least the minimum number of pixels needed to determine an appropriate threshold value.

A text area such as the payee 44 could alternatively be selected instead of the MICR text area.

Returning to FIG. 5, whether the threshold value calculation method has been selected for the binarization process is determined (S103). If the threshold value calculation method is selected (S103 returns yes), the threshold value for binarizing image data for the entire check obtained by a second scan (the "final scan" below) is then calculated based on the gray scale data for the selected parts of the check image obtained from the preliminary scan (S104).

If the sharpness method was selected and step S103 returns no, steps S104 to S106 are skipped and operation continues from the final scan in step S107.

Whether a calculation error or other problem occurred in the threshold value calculation process (S104) is then detected (S105). If an error occurred during threshold value calculation (S105 returns yes), the binarization method is changed to the sharpness method (S106). If an error did not occur (S105 returns no), that is, if the threshold value calculation process ended normally and the threshold value was computed, operation continues from step S107.

The check is then scanned (S107) and which binarization method was selected is detected (S108). If the binarization method is the threshold value calculation method (S108 returns "threshold value calculation method"), the threshold value determined in step S104 is retrieved (S109) and the gray scale data for the entire check acquired from the image reader 15 is then binarized using this threshold value to output binary image data (S112). This binary image data is then stored to the image memory 34 and sent to the image storage device as described above (S113).

If the binarization method is the sharpness method (S108 returns "sharpness method"), a sharpen process for emphasizing edge pixels is applied to the gray scale data for the entire check image input from the image reader 15 to produce the sharpened image data (S110). The preset threshold value for binarizing the check image data is then retrieved (S111) and the sharpened image data is binarized using this threshold value to generate the binary image data (S112). The binary image data is then stored to the image memory 34 and to the image storage device as described above (S113).

The sharpened image data is generated by applying a sharpen filter to the gray scale data in order to enhance the edge pixels. This conversion from gray scale data to sharpened image data is below referred to as a "sharpness conversion," and the process applying sharpness conversion to the image data is called an "image sharpening process."

Figure 13:
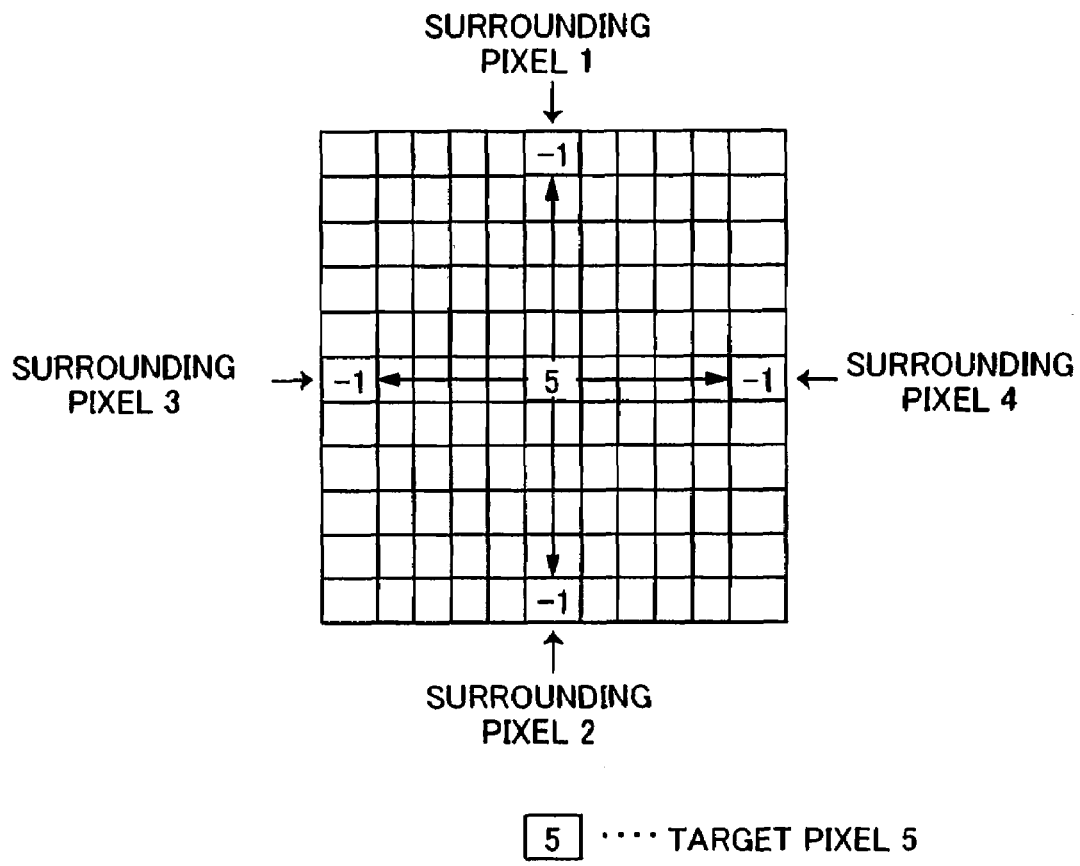
FIG. 13 shows an exemplary sharpen filter coefficient.

An example of an image sharpening filter is shown in FIG. 13. This filter sets the density of the target pixel by adding the weighted value (pixel density×k1) of the target pixel and the weighted values (pixel density×k2) of selected surrounding pixels. This process is applied to every pixel in the gray scale data to produce sharpened image data. The surrounding pixels are offset k3 pixels above, below, right, and left of the target pixel. This results in the sharpness conversion equation shown below where k1=5, k2=−1, and k3=5.

> target pixel density p after sharpness conversion=(target pixel density×k1)+(surrounding pixel 1 density×k2)+(surrounding pixel 2 density×k2)+(surrounding pixel 3 density×k2)+(surrounding pixel 4 density×k2)

where density p is set to 0 if p<0, and p is set to 255 if p>255, after sharpness conversion.

Figure 14:
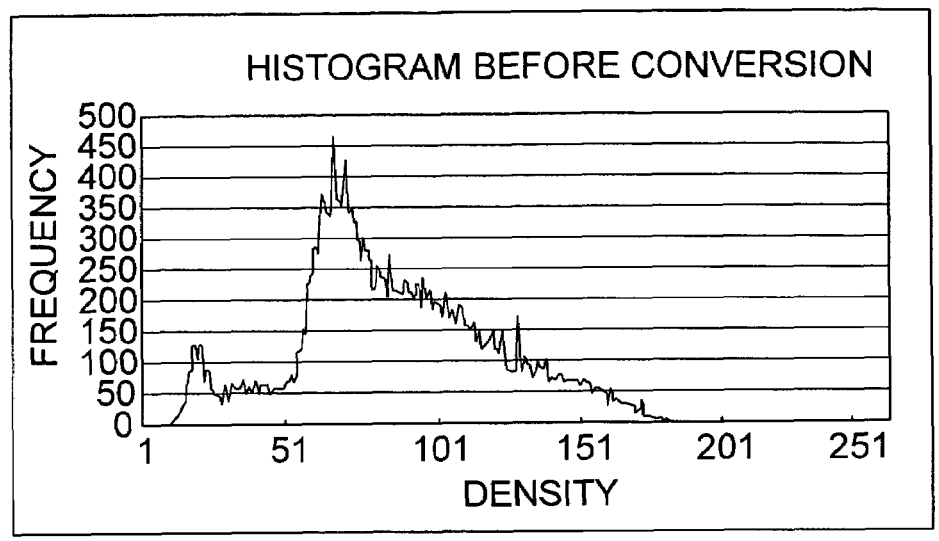
FIG. 14 shows histograms before and after the sharpen filter is applied.
Figure 14:
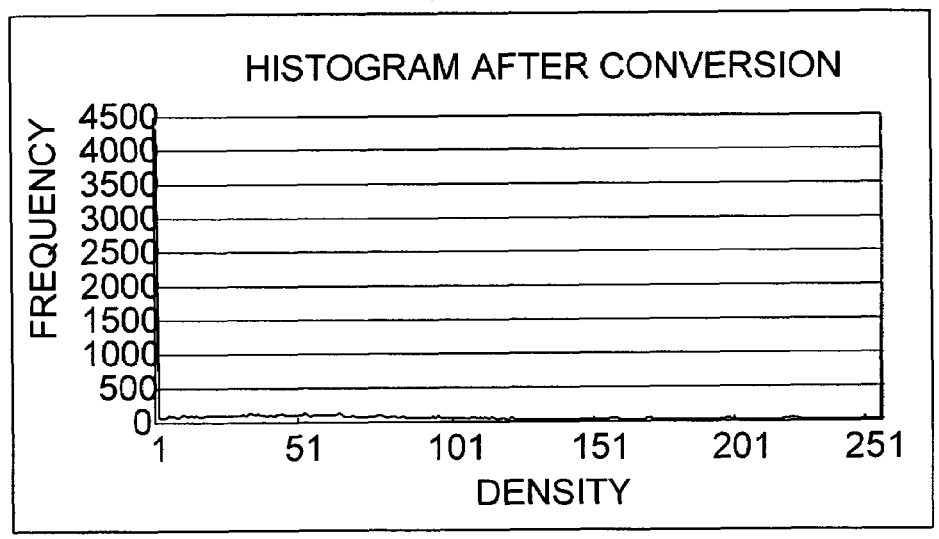

The image sharpening process is applied to all pixels in the gray scale data output by the main scanning operation using this sharpness conversion equation. FIG. 14(a) is a histogram of the image data before sharpness conversion, and FIG. 14(b) is a histogram of the data after sharpness conversion. As shown in FIG. 14 pixel density values are concentrated at 0 and 255 after sharpness conversion. It is thus known that good results can be achieved by binarizing the sharpened image data using a threshold value preset from 1 to 254.

A low threshold value, such as 30, is preferable. A low threshold value reduces the error pixels ("noise" pixels below) output by the binarization process, and increases the compression rate of the binarized data.

Figure 15:
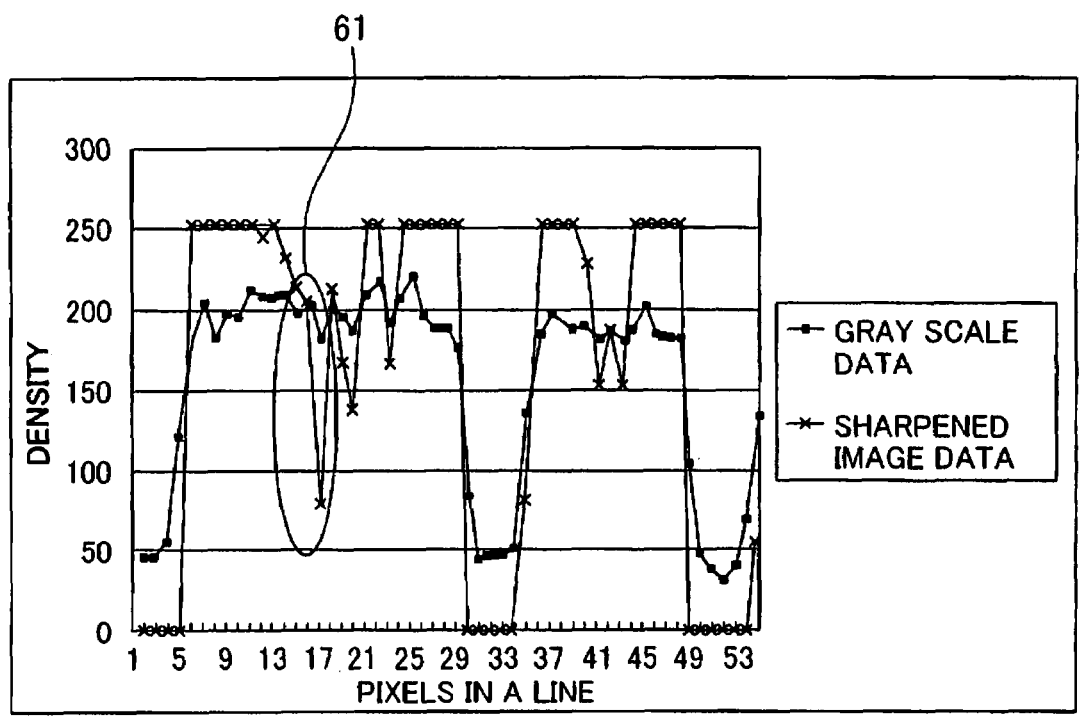
FIG. 15 shows density values before and after the sharpen filter is applied to one line of the MICR text area.

FIG. 15 shows the density values before and after sharpness conversion of one line in the MICR text area. The line of pixels is shown on the x-axis and the density values on the y-axis.

As shown in FIG. 15 the sharpened image data after sharpness conversion shifts the pixel density in black (dark) parts of the image to 0 and sets the pixel density in white (light) parts of the image to 255, thus emphasizing contrast between pixels. If there is a difference in the density of adjacent pixels before sharpness conversion, the difference is increased after sharpness conversion and contrast is enhanced.

Consider, for example, the pixel values in oval 61 in FIG. 15. Depending on the threshold value that is used, these pixels with a large density difference could become noise pixels after sharpness conversion. If the threshold value is 100, for example, an area that appears white before sharpness conversion becomes black after sharpness conversion, and is thus noise. It is therefore preferable to use a low threshold value such as 30 in order to reduce the number of noise pixels.

Figure 6:
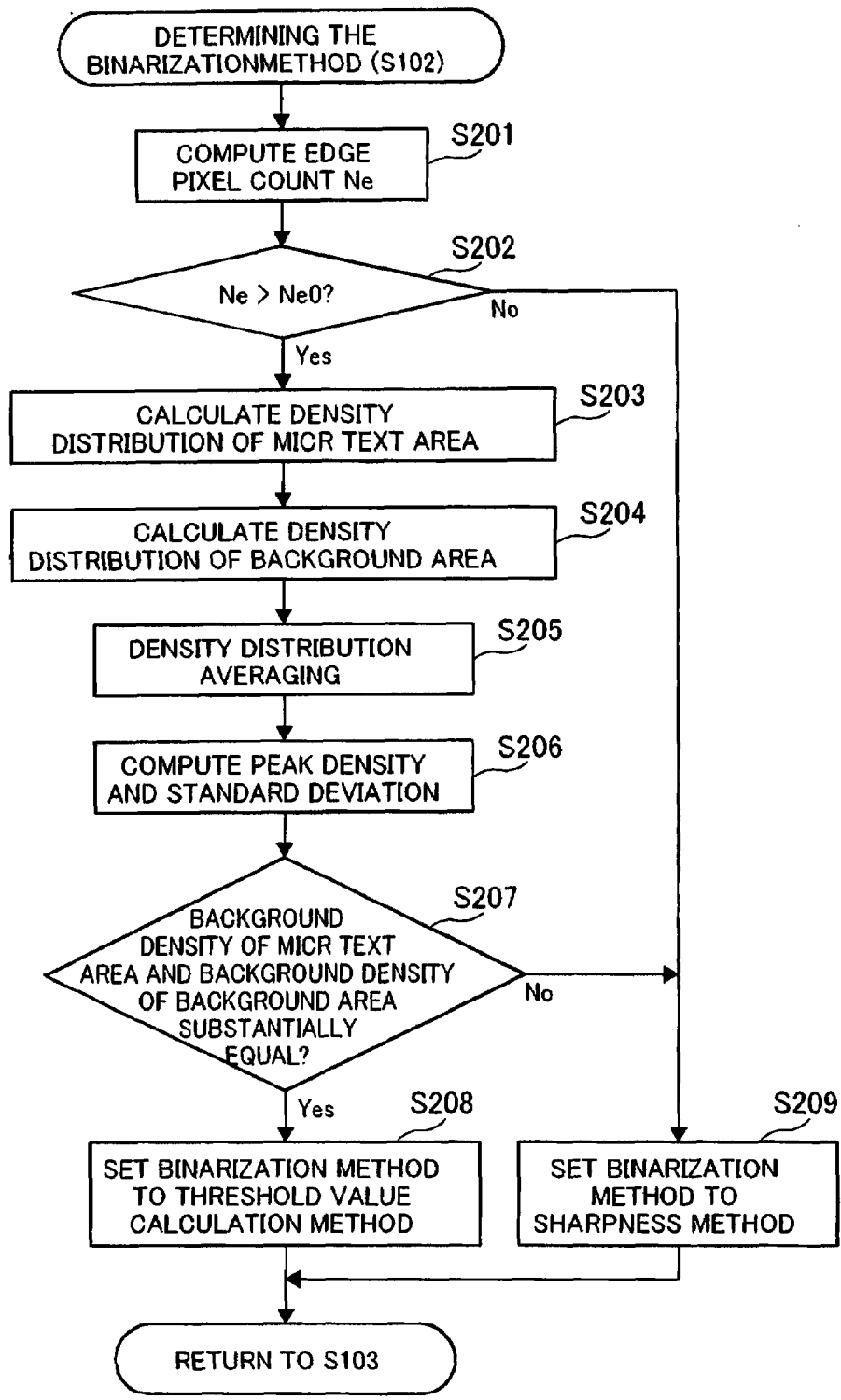
FIG. 6 is a flow chart describing a process for determining the image binarization method in a preferred embodiment of the invention.

FIG. 6 is a flow chart of an exemplary process for determining the method used in the binarization process.

First, using the partial gray scale data obtained from the check by the preliminary scan, edge pixels are detected in the area where background pattern 49 is present and in the edge evaluation area 75 where MICR text 48 is not present. The edge pixel count Ne is then determined (S201).

An "edge pixel" is here defined as any pixel for which the absolute value of the density difference to the surrounding pixels is high.

Further, edge pixels are detected by dividing the edge evaluation area 75 into plural blocks 76, and evaluating the pixels block by block.

Edge pixel detection process is described in further detail with reference to FIG. 12.

The first step is to calculate the density difference between a particular pixel (called the "target pixel") and specific surrounding pixels. FIG. 12(a) shows the spatial relationship between the target pixel (A) and the surrounding pixels (denoted by slashes) used for calculating the density difference used for edge pixel evaluation.

Figure 12:
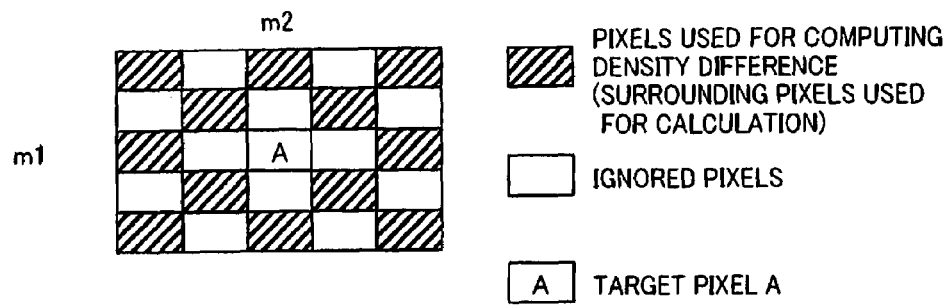
FIG. 12 describes edge pixel evaluation.
Figure 12:
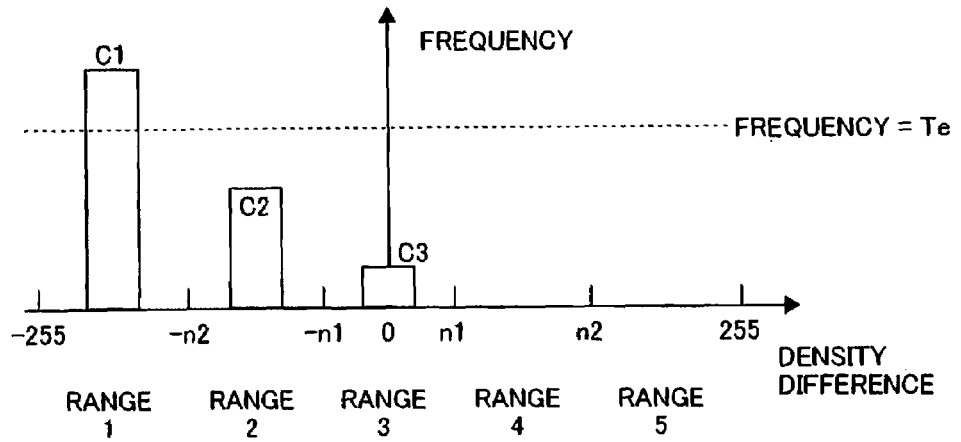
Figure 12:
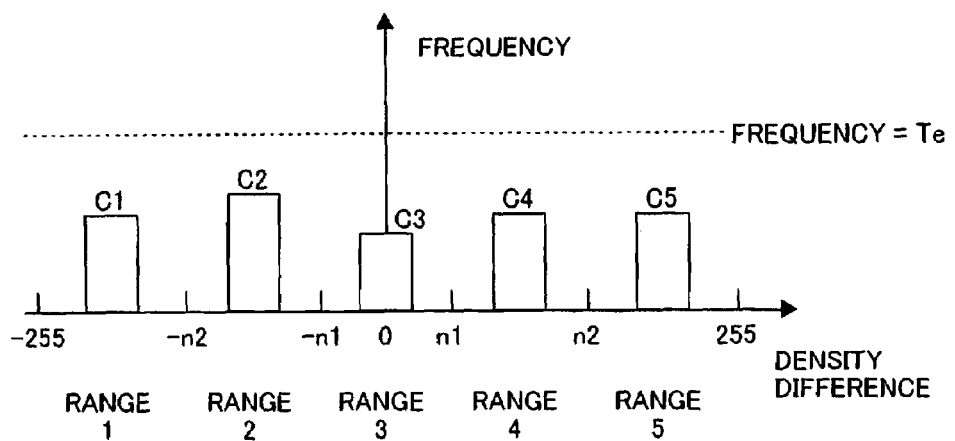

As shown in FIG. 12 a group of (m1×m2) pixels forms one block 76, the center pixel of the block is the target pixel, and selected pixels other than the target pixel in the same block are the surrounding pixels. In this example m1=5 and m2=5. Furthermore, because of the amount of time required to calculate the density difference if all pixels in the block other than the target pixel are used as the surrounding pixels for density difference calculation, time is saved by, for example, subsampling the pixels by a factor of two, i.e., using every other pixel for density difference calculation as shown in FIG. 12(a). These pixels are also referred to as the "surrounding pixels for calculation" herein.

This results in twelve surrounding pixels for calculating the density difference to the target pixel. The density difference between the target pixel and each of these twelve surrounding pixels is then computed. The resulting density difference values are then grouped into density difference ranges 1 to m3, and the number of pixels in each range is counted. In this example m3=5 and the density difference values are thus grouped into five density difference ranges.

Density difference range limits n1 and n2 (where n1 and n2 are positive integers) are first set to define the ranges. If Pi is the density difference, range 1 in this example contains all Pi where −255<=Pi<−n2; range 2 covers −n2<=Pi<−n1; range 3 covers −n1<=Pi<=n1; range 4 covers n1<Pi<=n2; and range 5 covers n2<Pi<=255. The density difference values between the target pixel and twelve surrounding pixels are thus assigned to the appropriate range, and the number of values in each range is counted. In this example n1=10 and n2=50.

FIGS. 12(b) and (c) show the frequency distribution of the density difference between the target pixel and surrounding pixels.

As shown in FIG. 12(b), if the density difference distribution is biased to density differences with a high absolute value, that is, if the density difference distribution is weighted toward range 1 or range 5, the density difference between the target pixel and surrounding pixels is known to be high.

On the other hand, if the values are not weighted in a particular range, the density difference between the target pixel and surrounding pixels is known to not be great. In this case the corresponding target pixel is known to not be an edge pixel.

One exemplary condition for determining if the density difference distribution is weighted toward a density difference with a high absolute value is shown below where $C_i$ is the frequency of range i and Te is a preset value.

($C_5$>Te and $C_1$=0) or
($C_1$>Te and $C_5$=0)

As noted above, each edge pixel is evaluated using a block of 5×5 pixels. Therefore, if the number of blocks in the edge evaluation area 75 is Nb, the number Ne of detected edge pixels is 0<=Ne<=Nb.

Returning to FIG. 6, the resulting edge pixel count Ne is compared with a specified count Ne0 (S202) to determine if Ne>Ne0. This specified count Ne0 is derived from experience and can be varied. In this preferred embodiment of the invention Ne0 is 10% of the number of blocks in the edge evaluation area, or more specifically Ne0=Nb×0.1.

If the edge pixel count Ne is greater than Ne0, i.e., Ne>Ne0 (S202 returns yes), operation proceeds from S203. However, if the edge pixel count Ne is less than or equal to the specific value Ne0, i.e., Ne<=Ne0 (S202 returns no), the binarization process is set to the sharpness method (S209).

Based on the partial check image data captured by the preliminary scan, a density distribution is then calculated for pixels in the area where MICR text 48 is present (S203), and a density distribution is then calculated for pixels in the area where the background pattern 49 is present (S204). An averaging process is then applied to both density distributions (S205) in order to remove noise components from the density distribution for the MICR text 48 area and the density distribution for the background pattern, producing a histogram.

The averaging process used here assigns as the value of dot i the average of nine values including the value of dot i and the values of the four dots before and after dot i. More specifically, the value of dot i becomes the average of dots (i−4), (i−3), (i−2), (i−1), i, (i+1), (i+2), (i+3), (i+4).

Figure 8:
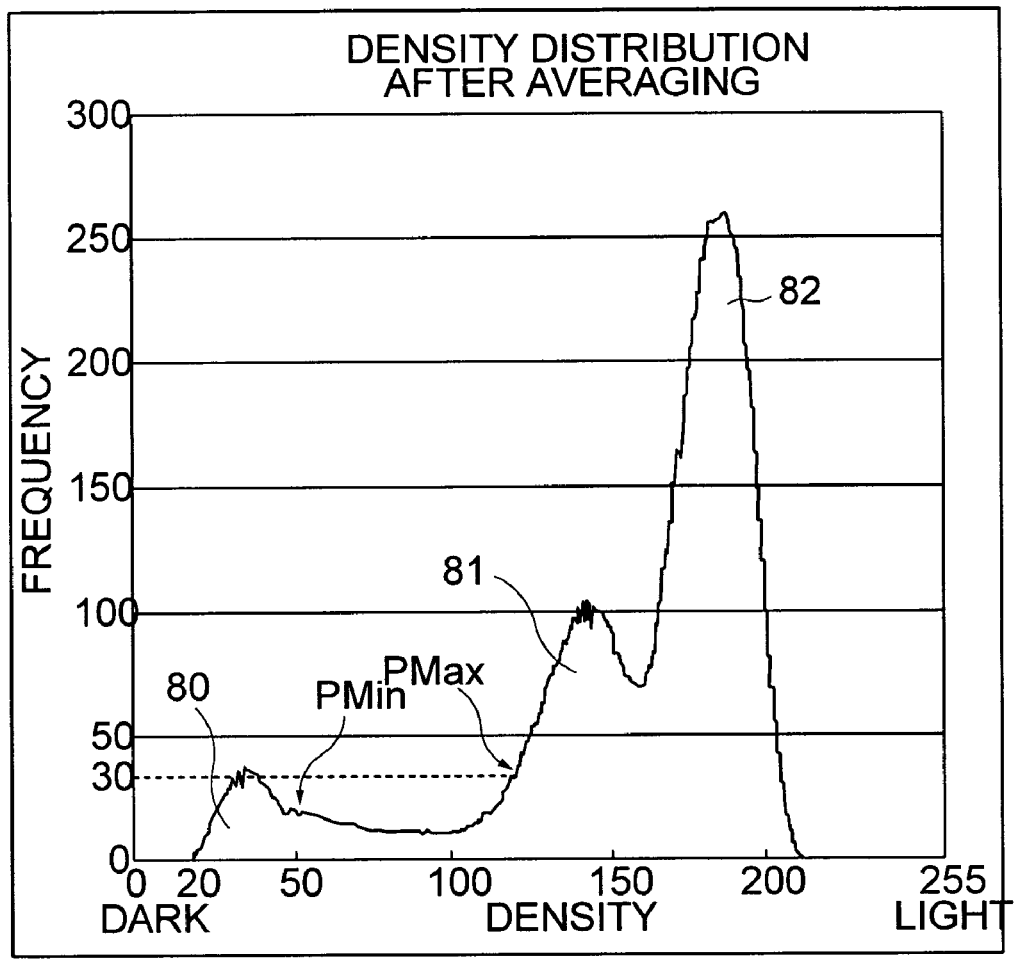
FIG. 8 is a frequency distribution (histogram) obtained by applying an averaging process to the MICR text area 74 and background areas 71 to 73 in the preliminary scanning area T of the check 40 shown in FIG. 3.

FIG. 8 shows a frequency distribution (histogram) after averaging values in the MICR text area 74 and background areas 71 to 73 in the preliminary scanning area T of the check 40 shown in FIG. 3. Pixel density is shown on the x-axis and frequency (pixel count) is shown on the y-axis. Density (brightness) values on the x-axis range from 0-255 where a lower numeric value denotes higher density (low brightness corresponding to a dark pixel).

In FIG. 8 the first peak 80 in the density range of approximately 20 to 60 represents a group of pixels forming a MICR character. The second peak 81 in the range of approximately 100 to 160 represents a group of pixels in the background pattern 49 of the MICR text area 74 (FIG. 7). The third peak 82 in the range of approximately 160 to 210 represents a group of pixels in the background pattern 49 in the background areas 71 to 73 (FIG. 7).

Figure 9:
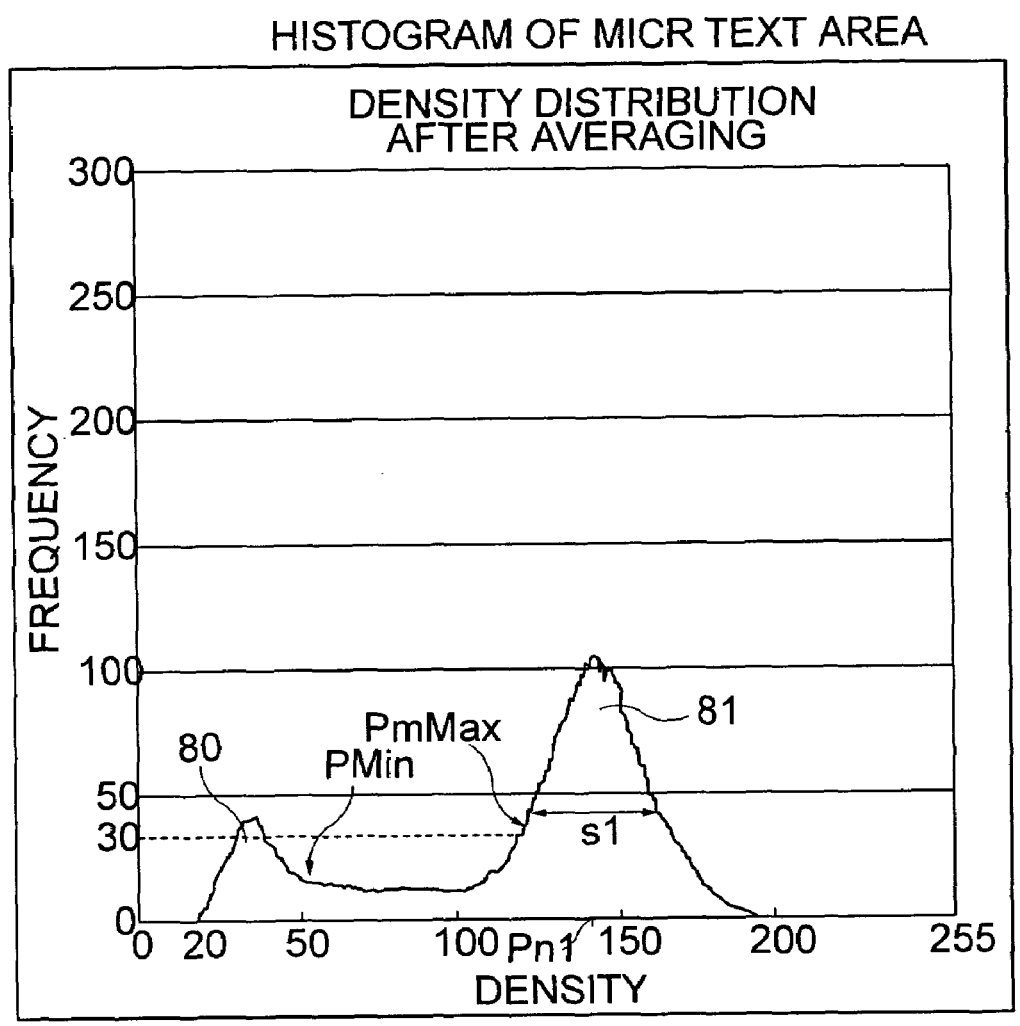
FIG. 9 is a histogram of the MICR text area 74 in the histogram shown in FIG. 8.
Figure 10:
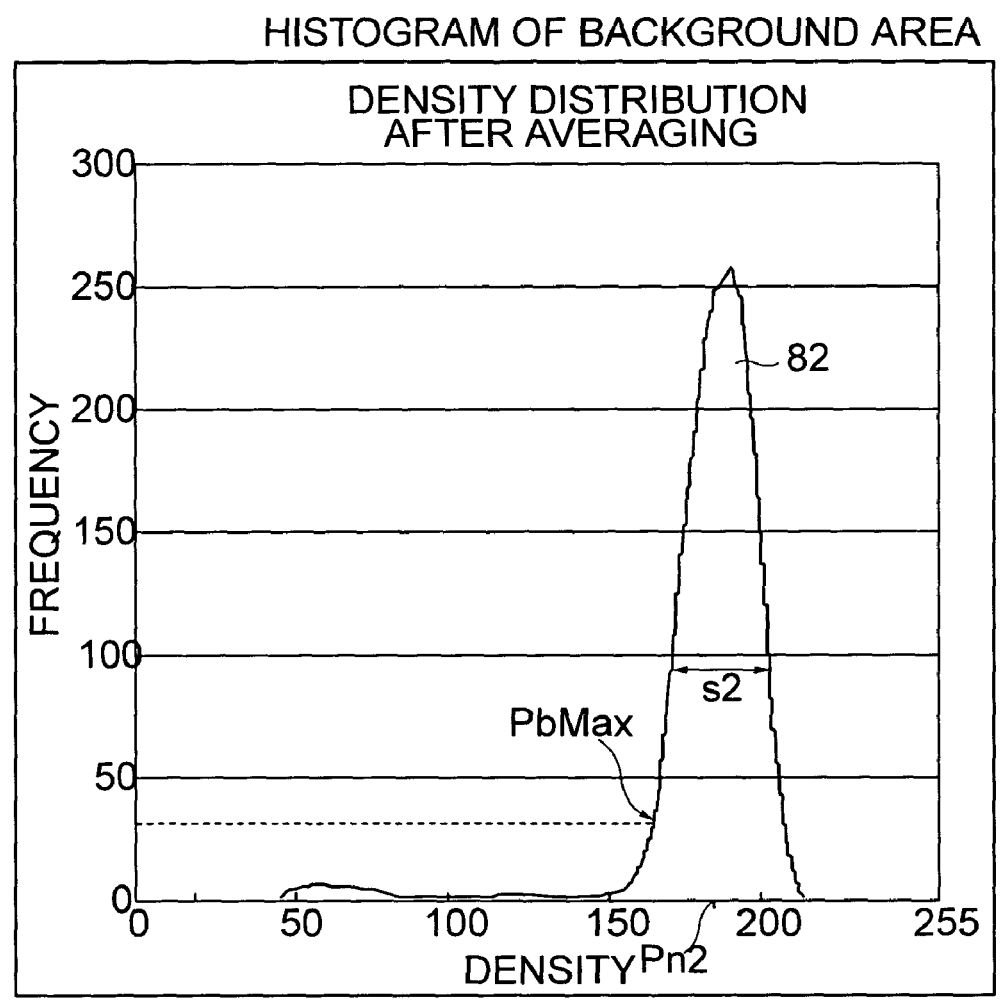
FIG. 10 is a histogram of the background areas 71 to 73 in the histogram shown in FIG. 8.

The histogram in FIG. 8 thus represents values in the MICR text area 74 and background areas 71 to 73. The histogram in FIG. 9 shows the MICR text area 74, and the histogram in FIG. 10 shows the background areas 71 to 73.

The peak density Pn1 and standard deviation σ1 of the background pattern 49 in the MICR text area 74, and the peak density Pn2 and standard deviation σ2 of the background pattern 49 in the background areas 71 to 73, are computed next (S206).

Whether the background density in the MICR text area 74 and the background density in the background areas 71 to 73 are substantially the same is then determined based on the peak density Pn1 and standard deviation σ1 in the MICR text area 74 and the peak density Pn2 and standard deviation σ2 in the background areas 71 to 73 (S207). This is done by, for example, determining if peak density Pn1 and peak density Pn2 are substantially equal and if standard deviation σ1 and standard deviation σ2 are substantially equal.

If the background density of the MICR text area 74 and the background density of the background areas 71 to 73 are substantially equal (S207 returns yes), the binarization method is set to the threshold value calculation method (S208). If the background density of the MICR text area 74 and the background density of the background areas 71 to 73 are not substantially equal (S207 returns no), the binarization method is set to the sharpness method (S209).

Figure 11:
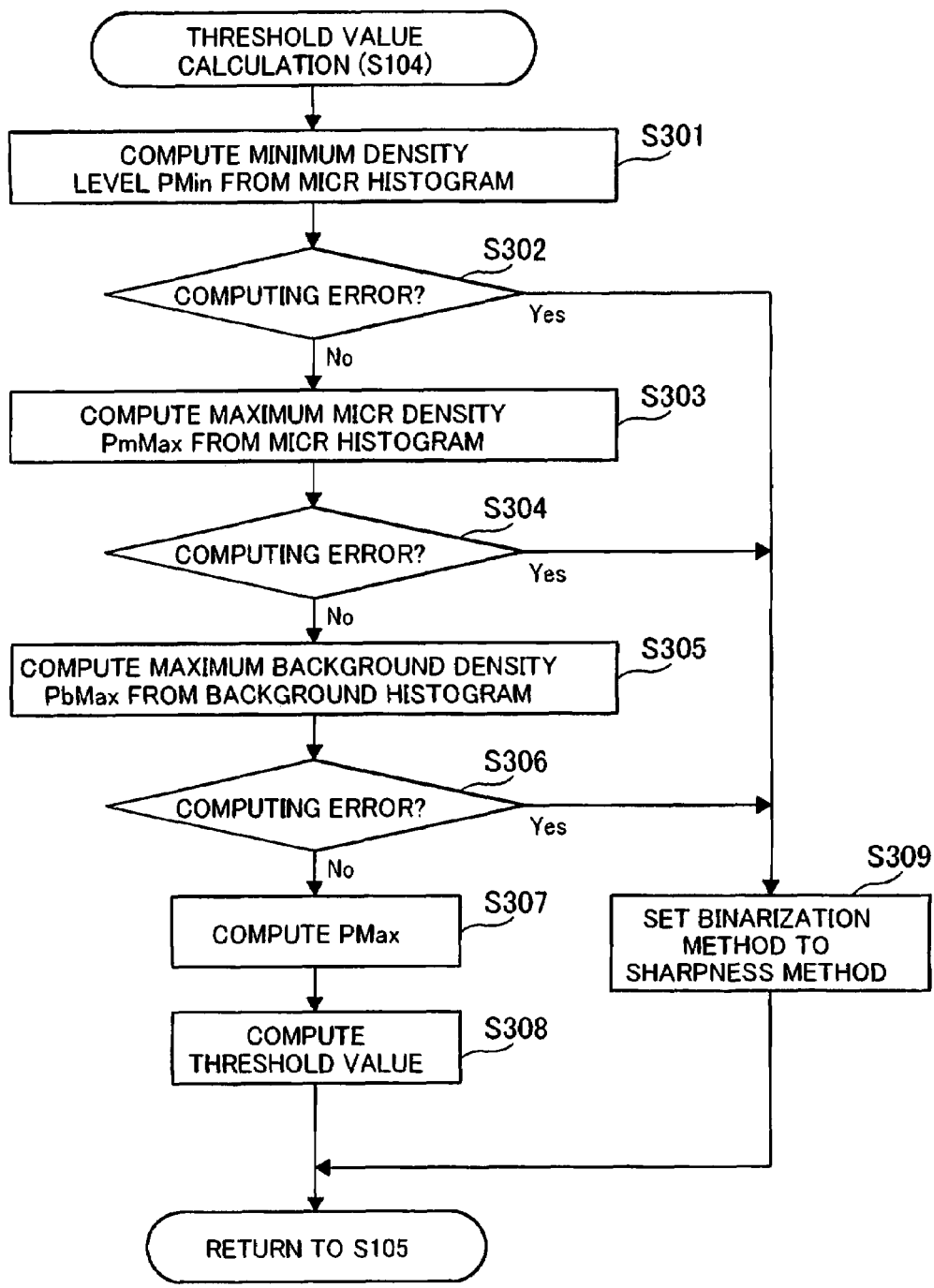
FIG. 11 is a flow chart describing a threshold value calculation method according to a preferred embodiment of the invention.

FIG. 11 is a flow chart of an exemplary threshold value calculation method.

The minimum density level PMin for calculating the threshold value is computed first from the histogram of the MICR text area 74 (see FIG. 8, FIG. 9) (S301). Because the threshold value is for separating the background from meaningful text, the threshold value must be set between the density of the MICR text and the density of the background. The minimum density level PMin for the threshold value must therefore be brighter than the MICR text. This minimum density level PMin is therefore computed first referenced to the density of the MICR text.

If minimum density level PMin cannot be determined from the histogram of the MICR text area (S302 returns yes), the binarization method is changed to the sharpness method (S309).

If minimum density level PMin can be determined (S302 returns no), maximum MICR density PmMax (see FIG. 9) denoting the maximum density level of the MICR text area 74 is determined (S303). This maximum MICR density PmMax is the brighter limit derived from the histogram of the MICR text area 74. If the threshold value is set above this limit, i.e., is brighter then PmMax, it will not be possible to distinguish the background pattern 49 in the MICR text area 74 from the MICR text.

If maximum MICR density PmMax cannot be determined (S304 returns yes), the binarization method is changed to the sharpness method (S309).

If maximum MICR density PmMax is computed (S304 returns no), the maximum background density PbMax (see FIG. 10), i.e., the upper limit in the background areas 71 to 73, is determined (S305). This maximum background density PbMax is likewise the brighter limit value of the background areas 71 to 73. If the threshold value is set higher (brighter) than PbMax, it will not be possible to distinguish the background pattern 49 in the background areas 71 to 73 from the MICR text. If this maximum background density PbMax cannot be determined (S306 returns yes), the binarization method is set to the sharpness method (S309). Therefore, if the threshold value cannot be computed using the threshold value calculation method, checks processed with a read error can still be binarized by changing the binarization method to the sharpness method.

If maximum background density PbMax is computed (S306 returns no), the maximum limit PMax (FIG. 8) for the threshold value is determined (S307). This maximum limit PMax is the upper limit for the threshold value for removing the background pattern 49 in the MICR text area 74 and background areas 71 to 73. In this preferred embodiment of the invention maximum limit PMax is the lesser of maximum MICR density PmMax and maximum background density PbMax.

The threshold value is then computed from the resulting minimum density level PMin and maximum limit PMax (S308).

Alternative Embodiment Applied to a Hybrid Device

Checks are widely used for payment at the point of purchase in supermarkets and other retail stores. Supermarkets, for example, typically use POS systems at the checkout counters. When a check is used for payment conventional POS systems read the MICR text on the check and print such information as the payee, amount, and endorsement. In addition to these operations electronic processing and check clearing requires capturing images of the check front and back, and transmitting the transaction information with the image data.

Performing these tasks manually is both complicated for the operator and time-consuming. Furthermore, if the printer, MICR reader, scanner, and other components are discrete devices, finding sufficient installation space at the checkout counter can be a problem. This problem can be solved, however, by using hybrid systems integrating a printer and MICR reader.

More specifically, a hybrid system having an MICR reader and scanner integrated with the POS printer can uninterruptedly process a check from reading the MICR text to scanning and processing the printed sides of the check. This makes the operator's task significantly easier and shortens the time needed for check processing.

A hybrid system with a printing function enabling such check processing therefore preferably has a transportation path for carrying the check or other printing medium (referred to as simply the check below), a magnetic head disposed along the transportation path for reading the MICR text preprinted on the check, a first print head disposed along the transportation path for printing to a first side of the check, a second print head disposed along the transportation path for printing to a second side of the check, and a scanner (image reader) disposed along the transportation path for scanning the first or second side of the check.

A hybrid system of this type can be thought of as a POS printer with a check processing function.

A hybrid system having a POS printer function and an MICR reader function is described next below as a preferred embodiment of the present invention with reference to the figures.

Figure 16:
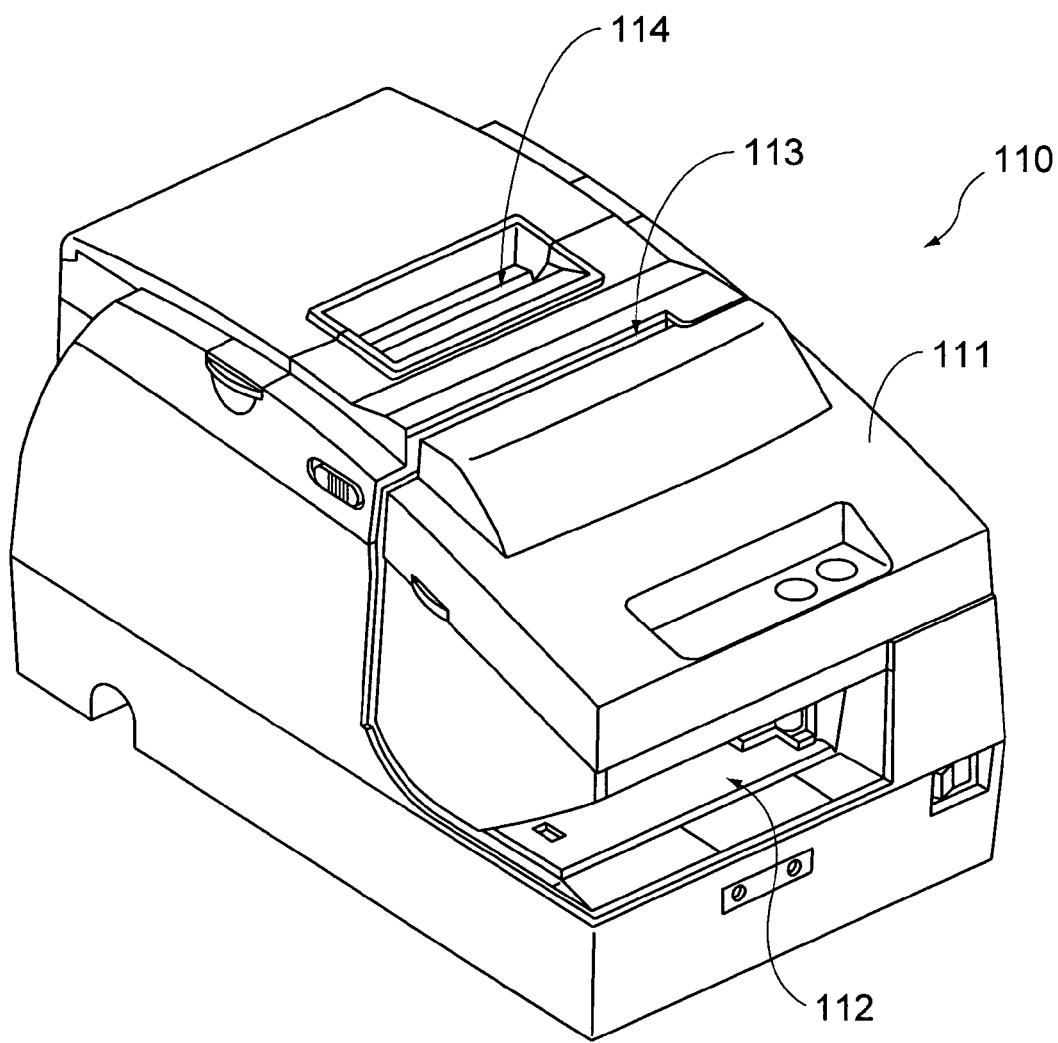
FIG. 16 is an oblique view of a hybrid apparatus 110 having a printing function.

FIG. 16 is an oblique view of a hybrid apparatus 110 having a POS printer function and an MICR reader function according to this preferred embodiment of the invention. As shown in FIG. 16, this hybrid apparatus 110 has a plastic cover 111. An insertion opening 112 for manually inserting a check P is formed at the front of the cover 111, and an ejection opening 113 from which the check P is ejected is formed at the top. At the back of the hybrid apparatus 110 is a roll paper housing (not shown in the figure) for holding roll paper. Roll paper held in this housing is guided passed the printing unit and ejected from a roll paper ejection opening 114 in the top.

Figure 17:
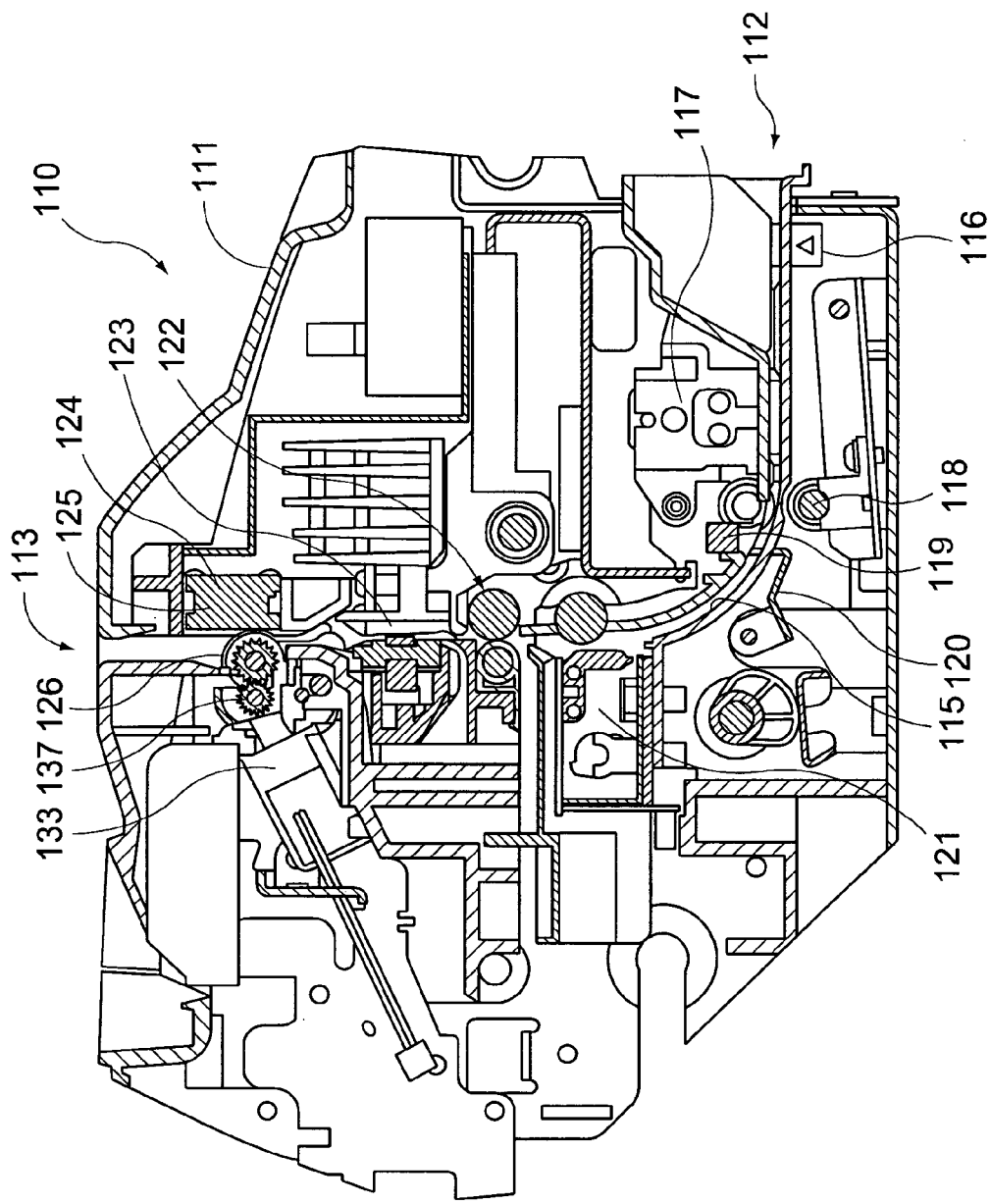
FIG. 17 is a side section view showing the internal configuration of the hybrid apparatus 110.

FIG. 17 is a side section view showing the inside of this hybrid apparatus 110. As shown in this figure a transportation path 115 for conducting the check P from the insertion opening 112 to the ejection opening 113 is formed inside the hybrid apparatus 110. The insertion opening 112 side of the transportation path 115 is horizontally oriented and the transportation path 115 curves in an L-shape between the insertion opening 112 and the vertically oriented ejection opening 113 side of the path.

Disposed along the transportation path 115 in order from the insertion opening 112 are a form trailing-edge detector 116, MICR head (magnetic head) 117, first feed roller pair 118, form leading-edge detector 119, form positioning member 120, back print head (second print head) 121, second feed roller pair 122, front print head (first print head) 123, form ejection detector 124, scanner 125. A scanner feed roller (pressure feed roller) 126 is also disposed opposite the scanner 125.

The trailing-edge detector 116, leading-edge detector 119, and form ejection detector 124 are, for example, light-transmitting or reflecting photodetectors for contactlessly detecting the presence of a check P at the respective parts of the transportation path 115.

The form positioning member 120 temporarily stops a check P inserted from the insertion opening 112 at a specific position. The form positioning member 120 is typically moved by a solenoid or other type of actuator between a position where it projects into the transportation path 115 and a position where the form positioning member 120 is retracted from the transportation path 115.

The first feed roller pair 118 and second feed roller pair 122 each comprise two rollers disposed on opposing sides of the transportation path 115. One roller in each pair is a drive roller for transporting the check P forward or reverse. One roller in each pair is also retractable from the other roller by means of a solenoid or other actuator so that the transportation path 115 can be opened and closed.

Figure 18:
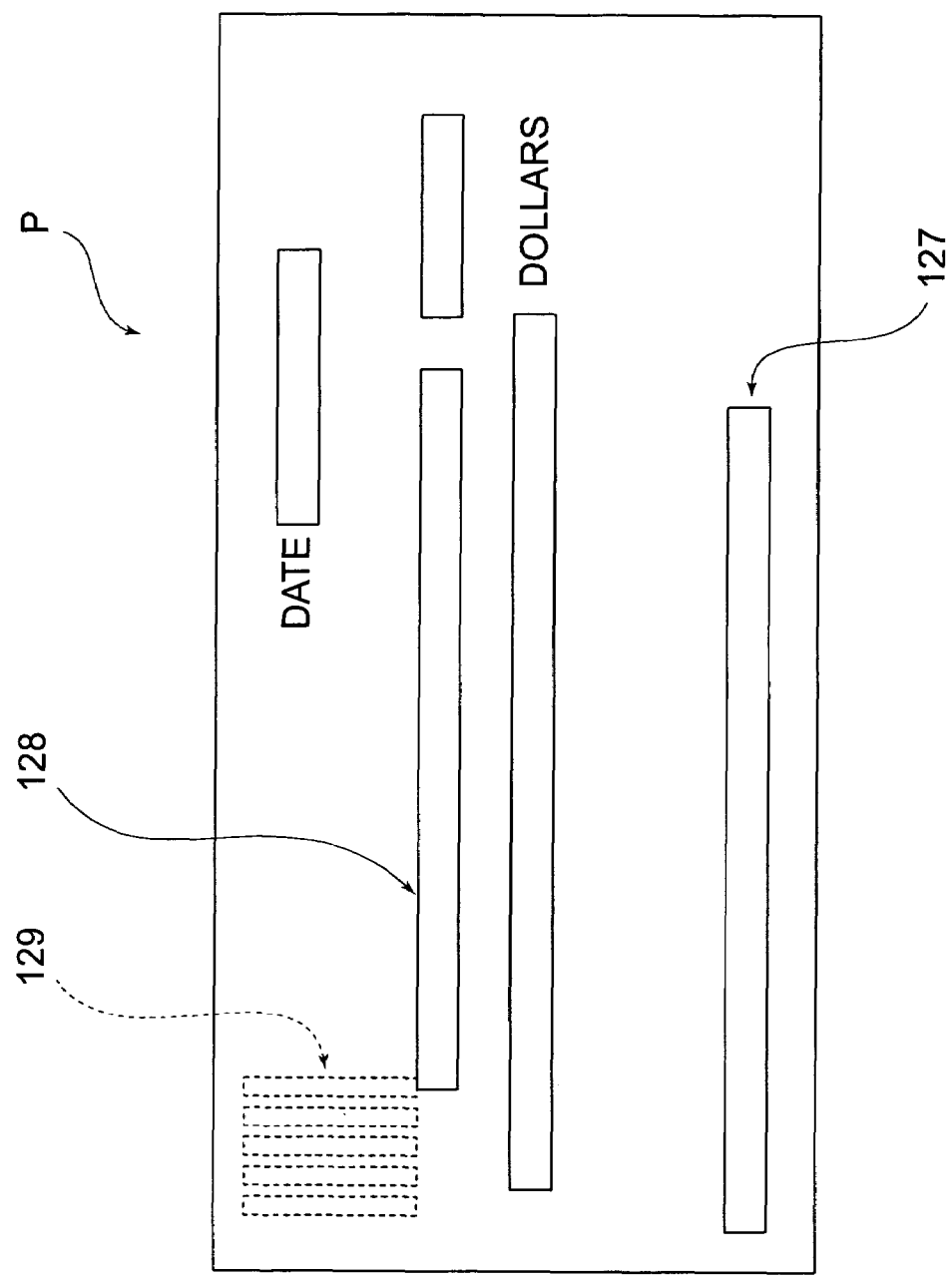
FIG. 18 is a schematic view of a check.

The MICR head 117 is for reading magnetic ink characters preprinted on the face of the check P. Check validity can be determined based on the data read by the MICR head 117. The magnetic ink characters are printed in a MICR recording block 127 in a specified location on the front of the check P as shown in FIG. 18. The information contained in the MICR data includes the checking account number and tracking information for the check P.

A pressing member 117a for pressing the check P to the MICR head 117 when reading the magnetic ink characters is disposed opposite the MICR head 117. Except when reading, this pressing member 117a is retracted from the MICR head 117 to open the transportation path 115.

The front print head 123 is for printing the payee, date, amount, and other information to designated areas 128 on the front of the check P as shown in FIG. 18. The front print head 123 is a serial print head mounted on a carriage, and prints a dot matrix of one or more columns at a time while travelling widthwise to the check P. The front print head 123 in this preferred embodiment is a dot impact print head for transferring ink from a ribbon onto the check P, but other types of print heads could obviously be used.

The back print head 121 prints information needed by the merchant accepting the check, including the customer verification number, date, and payment amount, to the back of the check in an endorsement area 129.

The back print head 121 is a shuttle print head having multiple heads disposed at a specific interval widthwise to the check P for printing a dot matrix of one or more columns each as the heads move within this interval. The back print head 121 in this preferred embodiment is a dot impact print head for transferring ink from a ribbon onto the check P, but other types of print heads could obviously be used.

The scanner 125 is equivalent to the image reader 15 shown in FIG. 1, and is used to scan the front of the printed check P to capture an image thereof. The captured image data is stored to an image storage device (not shown in the figure), and is used for electronic clearing and transaction verification. The captured image data is preferably compressed before being stored to the image storage device. As also described above, a threshold value is computed after preliminary scanning of the check P, and the check image data obtained by a final scan is then converted to binary image data using this threshold value.

A contact image sensor (CIS) is used as the scanner 125 in this preferred embodiment of the invention, and it is assumed below that the check P is pressed against the scanner surface 125*a*.

Figure 19:
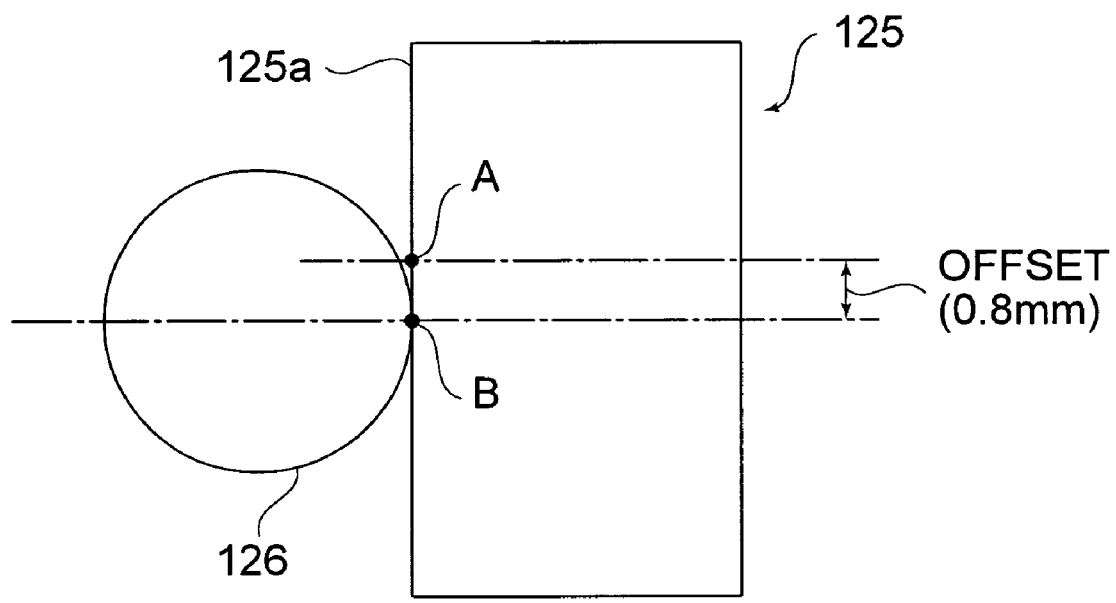
FIG. 19 is a side view showing the relationship between the scanner and the scanner feed roller.

The scanner feed roller 126 transports the check P for scanning, pressing the check P to the reading surface 125*a* of the scanner 125 and carrying the check P to the ejection opening 113 side. The scanner feed roller 126 applies pressure to the check P not at the focal point A of the scanner 125 but at a position B slightly offset from the focal point A as shown in FIG. 19. The scanner focal point A is thus offset either upstream or downstream in the transportation direction from the contact point B of the scanner feed roller 126. In this preferred embodiment of the invention the scanner focal point A is offset 0.8 mm downstream (i.e., to the ejection opening 113 side) from the point B where the scanner feed roller 126 contacts the check P. This prevents the scanner feed roller 126 from applying pressure directly to the focal point of the scanner, thereby reducing the transfer of ink to the scanner focal point A when scanning the check P immediately after printing. This significantly prevents a drop in the quality of scanned images due to ink dirtying the scanner surface.

Furthermore, by offsetting the scanner focal point A from the contact point B of the scanner feed roller 126, a larger area can be scanned at the leading edge of the check P. If the focal point A is offset greatly from the contact point B of the scanner feed roller 126, the check P can separate from the scanner surface 125*a* at the focal point A. However, by using an offset of only 0.8 mm as noted above, separation of the check P from the scanner surface 125*a* is held to at most 0.2 mm and there is no chance for a drop in scanning quality.

The scanning operation starts with a preliminary scan (first scan) whereby image data for parts of the check is captured to determine the binarization method and/or calculate the threshold value as described above. A final scan (second scan) is then completed after the binarization method is set to the sharpness method or the threshold value is calculated if the binarization method is set to the threshold value calculation method based on the image data from the preliminary scan. During this final (second) scan the check P is transported upward by the scanner feed roller 126 while it is scanned, and is thus ejected from the ejection opening 113. The trailing edge part of the ejected check P is held in the transportation path 115 on the downstream side of the scanner feed roller 126 at this time. The end part of the transportation path 115 between the scanner feed roller 126 and ejection opening 113 is thus vertically oriented and approximately equal to ⅙ the length of the check P (i.e., L/6 where L is the length of check P) so that the trailing end of the ejected check P can be held and the check P can be prevented from falling out of the hybrid apparatus 110.

EFFECTS OF THE INVENTION

As described above an image processing apparatus and method according to this invention determines the method used to binarize the image of a negotiable instrument based on image data obtained by a preliminary scan of selected parts of the same negotiable instrument. Based on the selected binarization method, the invention then correctly acquires the account number, payment amount, payer, payee, and signature as essential image information in a small data size, and can acquire in a small data size an accurate image of the negotiable instrument to enable electronic processing and clearing.

That is, information can be acquired at high speed in a smaller data size by the threshold value calculation method, and an accurate image of the instrument can be acquired by the sharpness method.

A preferred embodiment of our invention can also efficiently read MICR text, print essential information, and acquire an image of a check or other negotiable instrument to enable electronic clearing of check payments. The check or other instrument can therefore be continuously processed in single operation from reading magnetic ink characters to scanning the printed side of the check. This makes operation easier for the operator and shortens the required processing time.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image processing apparatus, comprising
   a main processing unit that captures first image data by scanning substantially an entire area of one side of a negotiable instrument and converts the first image data to binary image data in accordance with one of at least first and second binarization methods, each of which is independent of the other and each of which involves a separate analysis of selected gray scale data; and
   a pre-processing unit that captures second image data by scanning only a partial area of the one side of the negotiable instrument, the pre-processing unit having an evaluation section that evaluates the second image data and, based on the evaluation of the second image data, selects the binarization method to be executed by the main processing unit to convert the first image data to binary image data.

2. An image processing apparatus as described in claim 1, wherein the partial area includes a text area containing magnetic ink characters printed on the negotiable instrument and one or more background areas containing a background pattern in at least a portion thereof.

3. An image processing apparatus as described in claim 2, wherein said evaluation section comprises:
   an edge pixel detection unit that detects edge pixels in the one or more background areas; and
   a first selector that selects the binarization method based on a relative comparison of the number of detected edge pixels to a predetermined value.

4. An image processing apparatus as described in claim 2, wherein the evaluation section selects the binarization method based on a threshold value calculation using a density distribution of pixels in a background of the text area and a density distribution of pixels in the one or more background areas.

5. An image processing apparatus as described in claim 1, wherein the pre-processing unit further comprises:
   a threshold value calculator that sets a threshold value for use in executing the selected binarization method, the threshold value for the first binarization method being derived from a density distribution of the second image data and the threshold value for the second binarization method being set at a predefined constant value, wherein the evaluation section selects the second binarization method if the threshold value calculated from the density distribution of the second image data exceeds a predetermined number or does not compute within a given range; and a secondary binarization unit that sharpens the first image data by enhancing edge pixels of the first image data during execution of the second binarization method, if the threshold value is set at the predefined constant value.

6. An image processing apparatus as described in claim 3, wherein the preprocessing unit further comprises:

a threshold value calculator that sets a threshold value for use in executing the selected binarization method, the threshold value for the first binarization method being derived from a density distribution of the second image data and the threshold value for the second binarization method being set at a predefined constant value;

a histographic generator that counts the number of pixels for each density value and computes the density distribution from the pixel count, wherein the evaluation section selects the second binarization method if the threshold value calculated from the density distribution computed by the histographic generator exceeds a predetermined number or does not compute within a given range; and a secondary binarization unit that sharpens the first image data by enhancing edge pixels of the first image data during execution of the second binarization method, if the threshold value is set at the predefined constant value.

7. An image processing method for a negotiable instrument, comprising the steps of:

(a) scanning substantially an entire area of one side of the negotiable instrument to capture an image thereof and an image of a partial area of the one side of the negotiable instrument;

(b) evaluating the captured image of the partial area;

(c) selecting a binarization method from at least first and second independent binarization methods, each of which involves a separate analysis of selected gray scale data, based on the evaluation of step (b); and (d) converting the image of substantially the entire area of the one side of the negotiable instrument to binary image data by applying the binarization method selected in step (c).

8. An image processing method as described in claim 7, wherein the partial area includes a text area containing magnetic ink characters printed on the negotiable instrument and one or more background areas containing a background pattern in at least a portion thereof.

9. An image processing method as described in claim 8, further comprising the step of (e) detecting edge pixels in the one or more background areas;

wherein the selection of the binarization method in step (c) is further based on the number of edge pixels detected in step (e).

10. An image processing method as described in claim 8, wherein the selection of the binarization method, in step (c) is further based on a density distribution of pixels in a background of the text area and a density distribution of pixels in the one or more background areas.

11. An image processing method as described in claim 7, further comprising the step of, (e) setting a threshold value for use in executing the selected binarization method, the threshold value for the first binarization method being derived from a density distribution of the captured image of the partial area and the threshold value for the second binarization method being set at a predefined constant value, wherein the second binarization method is selected in step (c) if the threshold value calculated from the density distribution of the captured image of the partial area exceeds a predetermined number or does not compute within a given range; and (f) sharpening the captured image of the entire area by enhancing edge pixels thereof, if the second binarization method is selected in step (c), wherein, in step (d), the sharpened image of substantially the entire area of the one side of the negotiable instrument is converted to binary image data by applying the binarization method selected in step (c).

12. A computer-readable medium carrying instructions for executing the steps of the image processing method of claim 7 to electronically process a negotiable instrument.

* * * * *